United States Patent [19]

Kendall et al.

[11] 3,819,060
[45] June 25, 1974

[54] DAMPING APPARATUS

[75] Inventors: Giles A. Kendall, Burbank, Calif.;
William D. Wallace, Chicago, Ill.

[73] Assignees: Menasco Manufacturing Co.,
Burbank, Calif.; Miner Enterprises, Inc., Chicago, Ill. ; part interest to each

[22] Filed: Aug. 17, 1973

[21] Appl. No.: 389,433

[52] U.S. Cl. .................................. 213/43, 267/64 R
[51] Int. Cl. ............................................. B61g 9/08
[58] Field of Search .................. 213/43, 8; 188/282; 267/64 A, 64 B, 64 R

[56] References Cited
UNITED STATES PATENTS

| | | | |
|---|---|---|---|
| 3,559,818 | 2/1971 | Knippel et al. | 213/43 X |
| 3,726,419 | 4/1973 | Anderson et al. | 213/43 |

Primary Examiner—M. Henson Wood, Jr.
Assistant Examiner—Michael Y. Mar
Attorney, Agent, or Firm—Robert E. Geauque

[57] ABSTRACT

The cushioning assembly of this invention has an elongated housing with one closed end wall and a cylindrical passageway extending lengthwise from the closed end wall. A damped spring cartridge unit is slidingly mounted within the cylindrical passageway with its piston in an abutting engagement with the closed end wall. The other end of the damped spring unit projects outwardly of the housing and is in abutting engagement with a force transfer member extending crosswise to the axis of the housing. The damping apparatus of this invention is included within the damped spring cartridge unit. The damping apparatus employs the use of a piston head assembly which comprises a fixed annular disc with a gap or space located between the periphery of the fixed annular disc and the wall of the damping chamber. The fixed member includes an axial extension upon which is slidably mounted a movable member. The movable member is slidable between the damping position and a return position. With the movable member in contact with the fixed member (damping position) the gap is closed preventing movement of the damping medium from one side of the piston head to the other side of the piston head. Upon the damping force reaching a predetermined level, the fixed member is tiltable thereby causing the fixed member to be displaced thereby permitting the damping medium to be conducted through said gap.

14 Claims, 11 Drawing Figures

DAMPING APPARATUS

BACKGROUND OF THE INVENTION

This invention relates to a draft gear coupling device and more particularly to an improved means for cushioning the impact of draft and buff forces imparted to coupling means coupling adjacent cars of a railway vehicle. Included within this cushioning assembly is a damping apparatus which can be employed in any field where the use of a damper is desired. Particularly, the damping apparatus of this invention is found to be particularly useful in the area of damping shock forces in vehicular bumpers.

When the railroad cars are being moved about in a railroad yard, the initial coupling force can be quite severe. During this coupling procedure, it is desirable that this initial shock force be damped so as to decrease the load which is transferred into the railroad car. It is also desirable that during the normal pulling movement of the car as the train moves along the track, the damper not stroke and that it will in effect act as a rigid link. Stroking at the time of normal movement of the railroad car increases the wear of the damper which will normally result in premature replacement of the damping unit. Previously, there has been no known type of damping unit which accomplishes these objectives.

It is known to use a damping unit within a vehicle such as an automobile wherein the damping unit is placed between the bumper of the vehicle and the vehicle itself. When minor impact loads (up to 5 miles per hour) are encountered by the vehicle, the damping assembly is capable of absorbing the energy resulting in no damage to the vehicle and only transfers a minor force to the vehicle itself.

The damping apparatuses of the prior art have been designed to increase the damping force at a steady rate based on the impact velocity imparted to the damping unit. As the velocity increases, so does the damping force. Previously there has been no known type of damping apparatus wherein the substantial constant load force is transmitted regardless of the stroking velocity. In previous types of damping apparatuses, as the stroking velocity increased, the load increased proportionally. This type of damping apparatus is particularly desirable to damp the shock force of the bumper of a vehicle. Vehicular bumpers in cooperation with the damping apparatus can be designed to absorb and transfer a load up to a 10 mile per hour velocity of the vehicle. However, once the 10 miles per hour is exceeded, a relief valve within the damping apparatus is activated which causes the load transferred to the vehicle to not exceed the level established by the 10 miles per hour velocity but the energy of the increased velocity is still to be absorbed by the damping apparatus. In other words, if the vehicle were to contact a fixed object at 15 miles per hour, the load which is conducted to within the vehicle (and to any passengers located within the vehicle) will appear to be substantially equal to the load imparted by a 10 mile per hour velocity.

In previous dampers, when the vehicle encounters greater impact loads, the damping assembly fails. This failure of the damping assembly results in none of the impact force being absorbed by the damping unit and the entire amount of the impact energy is transferred directly to the vehicle. The damping apparatus of this invention is designed so that when fail loads are encountered, the damping unit will absorb a portion of the impact energy thereby lessening the amount of impact energy that is transferred to the vehicle.

SUMMARY OF THE INVENTION

The principal object of the cushioning assembly of this invention is to provide a simplified construction of a conventionally functioned draft gear coupling device in which the main body or the housing serves the purpose of relieving the internally positioned spring damped unit from overload shock forces which without this protection can destroy the spring damped unit.

A further object of the cushioning assembly of this invention is to provide a simple housing having merely a central passageway lengthwise thereof for receiving the spring damped units and providing a spring damped unit for the housing, the latter being producible on a high production basis and being readily interchangeable one with another in the event of malfunction or should it be desired to increase the capacity of the draft gear for a particular installation or to reduce the capacity of the draft gear in the event high capacity is not required. This can be simply done by interchanging the spring damped units within the housing.

The primary objective of the damping apparatus of this invention is to prevent the transfer of peak loads through the damping apparatus into a movable structure such as a vehicle. The damping apparatus of this invention employs a piston head which includes a fixed member and a movable member. The fixed member is annular in configuration and is spaced a small distance from the wall of the damping medium chamber. The damping medium chamber is located within a cylinder. The damping medium is to be conductible through the gap between the chamber wall and the fixed member to each side of the piston head. Upon the load not exceeding a predetermined value, the movable member is located adjacent the fixed member and closes the gap, thereby preventing transfer of the damping medium through the gap. Upon the load exceeding a predetermined value, the fixed member is caused to deflect which results in a portion of the movable member to be spaced from the fixed member resulting in an opening of the gap and which thereby permits restricted flow of damping medium through the gap.

DETAILED DESCRIPTION OF THE SHOWN EMBODIMENT

Figure 1:
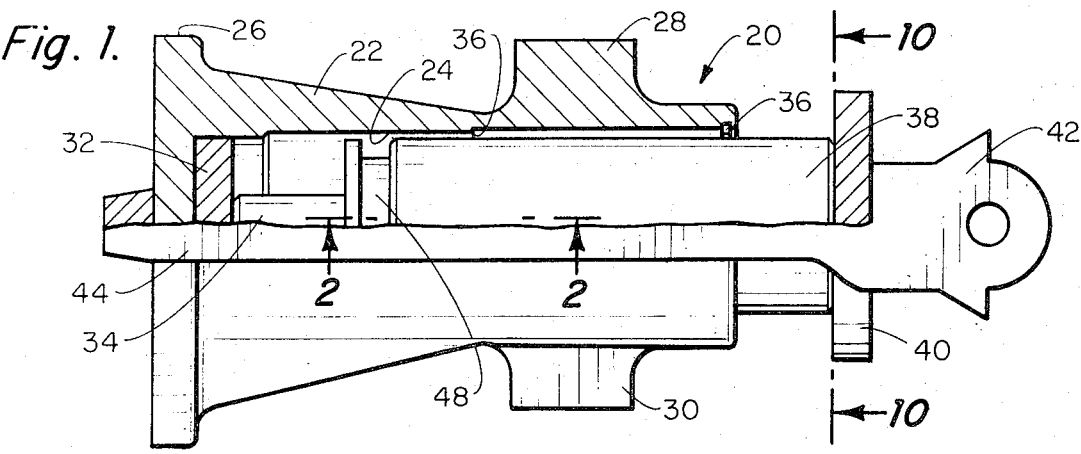
FIG. 1 is a fragmentary plan view partly in horizontal section depicting an embodiment of a draft gear utilizing the principles of this invention.

Referring particularly to the drawings, there is shown in FIG. 1 the cushioning assembly 20 of this invention which is adapted to be mounted in the end portion (draft gear pocket) of the center sill of a railway car together with a force transfer means. The force transfer means is to take the form of a linkage assembly which is conventional and forms no direct part of this invention. If the railway car receives either a compressive force or a tensile force, the linkage assembly will impart to the cushioning assembly a compressive movement only. The cushioning assembly 20 basically comprises outer housing 22 which is preferably made as a casting. The housing 22 includes an interior cylindrical chamber 24 which has an open end providing access thereto and a closed end. Integrally formed with a closed end wall of the housing 22 is a rectangular flange 26. The flange 26 is to facilitate securing of the cushioning assembly 20 within a draft gear pocket of a railway car.

The housing 22 is generally elongated and has a pair of generally parallel side walls and upward and lower outwardly curved walls. A pair of guiding ears 28 and 30 extend outwardly away from the upper and lower walls of the housing 22. The function of the guiding ears 28 and 30 is to facilitate mounting of the cushioning assembly 20 within a draft gear pocket.

Located within the cylindrical chamber 24 adjacent the closed end wall of the housing is a metallic spacer plate 32. The spacer plate 32 is to cause distribution of force which is transmitted through a piston rod 34 which will normally be in contact with the spacer plate 32. Mounted within the side wall of the chamber 24 in a spaced apart manner are a pair of guide and/or wear rings 36. The rings 36 are to provide support for a cartridge 38 and permit telescopic movement of the cartridge relative to the housing 22. The cartridge 38 is formed substantially hollow with the piston rod 34 extending within the hollow cartridge 38. The outer end of the cartridge 38 is secured to a flange 40 which is to function as a stop to limit the length of movement of the cartridge 38 with respect to the housing 22 by the flange 40 coming into contact with a portion of the housing 22 located about the open end of the chamber 24. The flange 40 is connected to a follower plate 42 of the force transfer means. The follower plate 42 is adapted to be connected to a conventional type of front follower to enable the cartridge 38 to be moved in response to buff forces exerted against the follower plate 42. The cartridge 38 is also movable in response to draft forces transmitted through a yoke or strap 44 of the yoke. Thus, it is to be noted that the follower plate 42 or the strap yoke 44 constitutes force transmitting means.

From the foregoing it will be appreciated that the novel arrangement of the cushioning assembly 20 of providing the piston rod 32 of the cartridge 38 facing the inner end of the cylindrical chamber 24 in the housing 22 and utilizing the casing of the cartridge 38 as the guiding surface for the damped spring assembly (to be described) prevents eccentric loading on the slim piston rod 34. Thus the piston rod 34 may be loaded close to its yield point in compression without allowing for any additional factor for bending.

Located within the cartridge 38 is a damping medium chamber 46. The chamber 46 is closed at the connection with the cartridge 30 with the flange 40 and is open at its opposite end. Threadedly connected to the cartridge 38 and communicating with the open end of the chamber 46 is a washer 48. The washer 48 is to be threadably connected a desired amount within the cartridge 38 in order to establish a preloading of the damping medium located within the chamber 46. This preloading will be explained further on in the specification.

The preferred damping medium to be located within the chamber 46 is to be a compressible solid. Various compressible solids can be utilized such as silicone rubbers (silastics) or other silicone base solids, natural or synthetic rubber compounds, metallic sodium, potassium, cesium or lithium. The silicone rubbers are produced from dimethyl, polysiloxanes in which various vulcanizing agents are incorporated to obtain various degrees of hardness and thereby various degrees of shear strength. The mark "Silastic" is the trade name for the silicone rubbers produced by Dow-Corning, these rubber products being available in a wide range of unit shear strength and compressibility.

For the purpose of the present invention, a solid is defined to be such materials as do not change dimensionally under a 1G stress loading. A compressible solid can be defined as a material which demonstrates significant reduction in volume when subjected to pressure. This reduction is an elastic phenomena caused by the reduction of the spacing between molecules of this material. When the pressure is removed from such a material, the spacing is restored to its original condition by intermolecular elastic forces. Of course, any solid to be compressible must be able to accomplish a change in volume and every substance is compressible to some extent. In addition, it is understood that all solids will flow plastically when subjected to a high enough pressure. As referred to herein, plastic flow of a compressible solid means the flow which results when the solid is subjected to a high enough pressure to produce a permanent change in relationship with the molecules, similar to the change which results in a fluid passing through an orifice. For example, sufficient pressure can be developed locally in a solid at a location adjacent to an orifice to cause the solid to flow plastically through the orifice, with a resulting permanent change in relationship of the molecules occurring during the plastic flow. The compressible solid utilized in the present invention exhibits both plastic flow and compressibility as defined above. For any given pressure, the volume of compressible solid remains constant irrespective of plastic flow of the material during damping which produces a reorientation of the individual molecules. Also the inherent relationship between pressure and volume of the compressible solid provides a spring force which returns the piston to the extended position.

Piston 34 includes a piston head 50 which is composed basically of a piston nut 52, a movable member 54 and a fixed member 56. The piston rod 32 is threaded and is adapted to threadingly receive the nut 52. The nut 52 is fixedly positioned once located upon the piston rod 34 by means of a pin 58. The function of the nut 52 is to provide a motion limiter for the movable member 54 and the movable member 54 can move between the nut 52 and the fixed member 56.

The fixed member 56 is basically disc-shaped and conforms to the contour of the chamber 46 (which is normally cylindrical). However, the periphery of the fixed member 56 is spaced from the wall of the chamber 46 a small distance to form an annular gap 60. The fixed member 56 is fixedly connected to the piston rod 34 at its radially innermost edge. Connected to the fixed member 56 at its radially innermost end is an axial extension 62. The outer surface of the axial extension 62 is cylindrical in configuration.

The movable member 54 is located about the axial extension 62 and is designed to closely conform thereto but is to be slidable in respect thereto. The movable member 54 has a seal 64 mounted in its periphery. The seal 64 will normally be composed of a resilient deformable material and is adapted to form a fluid-tight connection between the movable member 54 and the cartridge casing 38.

The damping medium (not shown) is adapted to be in continuous contact with the front face 66 of the fixed member 56. The movable member 54 includes a plurality of spaced apart apertures 68 through which the damping medium may be passed.

Figure 3:
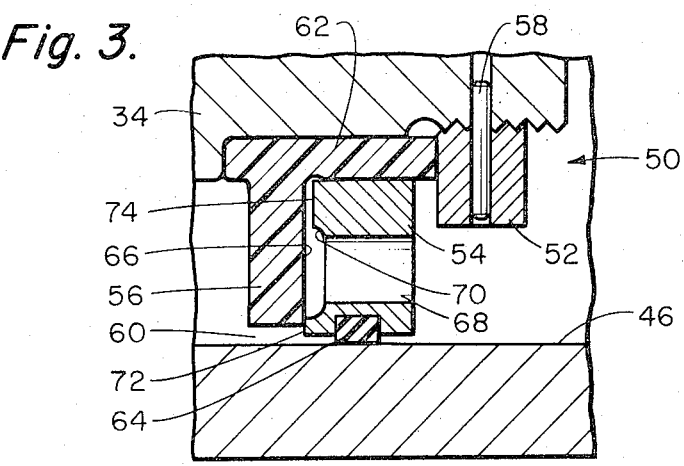
FIG. 3 is a cross-sectional view of the piston head showing the movable member closing the gap between the fixed member and the chamber wall.

The aft face of the movable member 54 includes an annular groove 70. Groove 70 communicates with each of the apertures 68. Forming the sides of the groove 70 are a radially outer wall 72 and a radially inner wall 74. It is noted that the outer wall 72 is of a greater height than the inner wall 74. With the movable member 54 in the position as shown in FIG. 3 of the drawings, the outer wall 72 is in contact with the fixed member 56 but the inner wall 74 is slightly spaced therefrom. This position is significant and will be explained further on in this specification.

Located within the chamber 46 and in an abutting contact with the washer 48 is a bearing 76. The bearing 76 includes a static seal assembly 78 on its periphery which is adapted to be in contact with the wall of the chamber 46. The inner surface of the bearing 76 is slidably located about the piston rod 34. Located within the bearing 76 is an annular recess 80. Located within the recess 80 is an anti-extrusion ring 82. Located adjacent the anti-extrusion ring is a rod seal 84 which will normally take a form of a plastic material having low frictional qualities such as Teflon. A sleeve 86 is to be in abutting contact with the seal 84 with the major portion of the sleeve 86 also located within recess 80.

Also formed within the bearing 76 is an enlarged interior spring chamber 88. Located within the chamber 88 is a bellville spring assembly 90. The spring assembly 90 is to be in contact with the sleeve 86 and also be in contact with a retainer 92. The retainer 92 is positioned initially against the shoulder 94 of the piston rod 34. The retainer 92 is fixedly connected to the cartridge casing 38.

It is desired that a certain amount of preload be established within the damping assembly of this invention. It is envisioned that normally 8,000 to 10,000 pounds per square inch of pressure will be preloaded into the damping assembly. This amount of preload is indicated at point B on FIG. 10 of the graph. This preload is necessary so that after a damping movement, the piston will be caused to return to its original position.

When the damping medium has been located in the chamber 46 and the piston head 50 positioned therein and also the retainer 92, the bellville spring assembly 90 and the bearing 76 along with sleeve 86, seal 84 and extrusion ring 82 are also located in position, the bearing 76 is axially displaced into the media by use of a press and then nut 48 is tightened by a tool, not shown, with respect to the cartridge casing 38. This tightening action retains bearing 76 in its preload position. Axial displacement of bearing 76 also causes the ring 82, seal 84 and sleeve 86 to compress the bellville spring assembly 90 against the retainer 92 and shoulder 93. The spring force is to effect compression of the seal 84 and force such into engagement with the piston rod 34. This is to prevent leakage of the damping medium exteriorly of the chamber 46 by being extruded out along the surface of the piston rod 34.

The amount of axial displacement of the bearing 76 determines the extension of the piston rod 34 within the chamber 46. The chamber 46 is to be filled with the compressible solid material prior to complete displacement of bearing 76 and tightening of the nut 48. Therefore, as bearing 76 is displaced the compressible solid chamber within chamber 46 becomes compressed, Normally, the bearing 76 is displaced and nut 48 is tightened until the preload or pressure of the compressible solid material within the chamber 46 reaches 8,000 to 10,000 p.s.i. Without this preload, the piston head and the piston rod 34 will not return to its initial state after accomplishing its damping function.

Located within the retainer 92 are a plurality of openings 96. The openings 96 provide a bleed for the damping medium to enter within the chamber 88. As the pressure increases within the chamber 46, the damping medium under increased pressure bleeds into chamber 88 and functions to also apply pressure against the sleeve 86 thereby further compressing the seal 84. This additional compressing of the seal 84 is desired as the pressure within the chamber 46 increases so that the seal 84 is further compressed as the pressure increases within the chamber 46.

Figure 2:
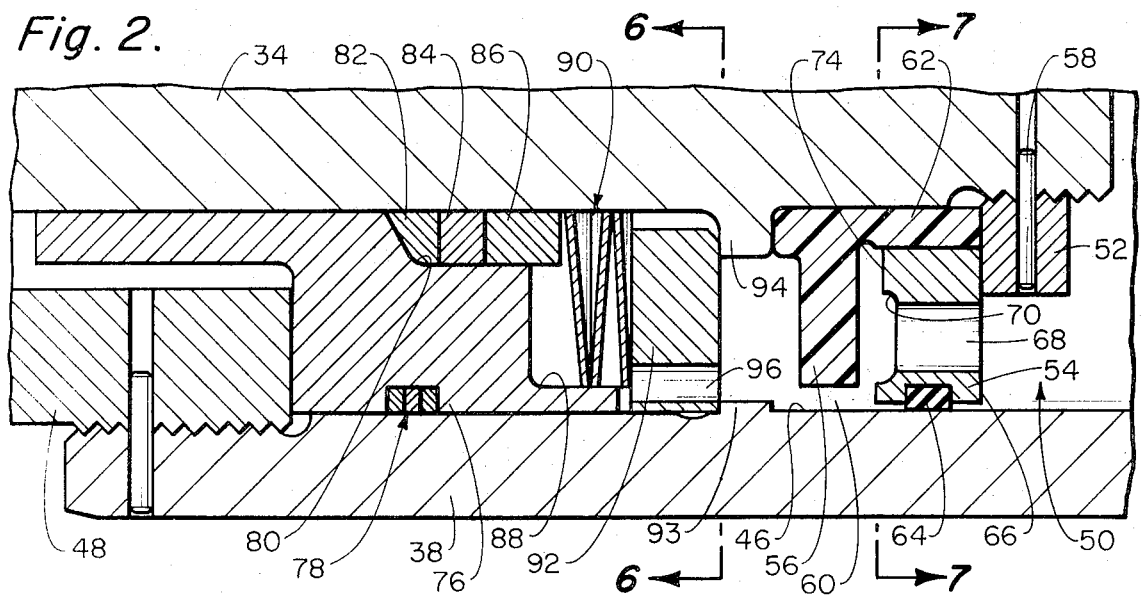
FIG. 2 is a cross-sectional view taken along line 2—2 of FIG. 1 showing the construction of the damping unit of this invention.

The operation of the damping apparatus of this invention is as follows: It will be assumed that the damping apparatus is in the initial or rest position shown in FIGS. 1 and 2 of the drawings. Upon a compressive force being transmitted to the plate 42, the cartridge 38 is caused to move inwardly within the chamber 24. The housing 22 is to be fixedly positioned. As a result, the piston head 50 moves longitudinally within chamber 46. As the piston rod 34 moves inwardly further within the chamber 46, a portion of the volume of the chamber 46 is taken up by the piston rod 34. As a result, the damping medium is compressed. It has been found that the internal pressure of 8,000 to 10,000 psi will be increased to approximately 40,000 psi at full entry of the piston rod 34 within the chamber 46.

Figure 4:
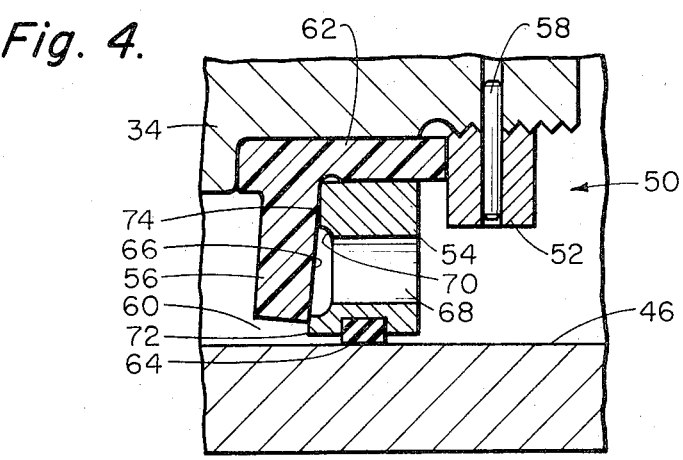
FIG. 4 is a view similar to FIG. 3 but showing the fixed member at an initial tilted position.
Figure 5:
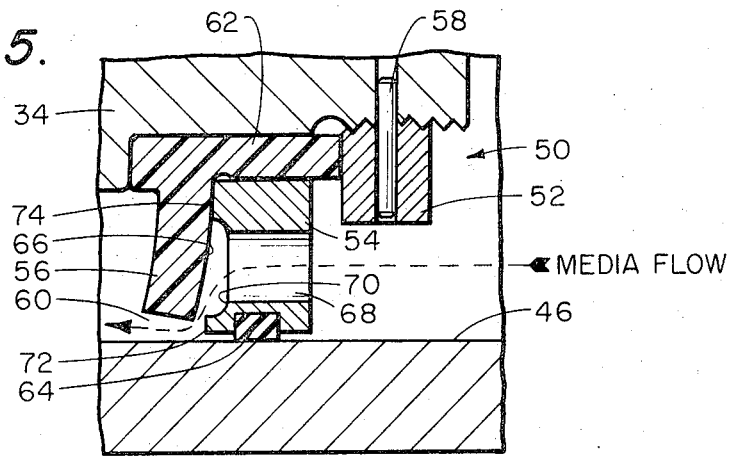
FIG. 5 is a view similar to FIG. 4 but showing the fixed member tilted to permit passage of damping medium through the gap between the fixed member and the wall of the chamber.
Figure 6:
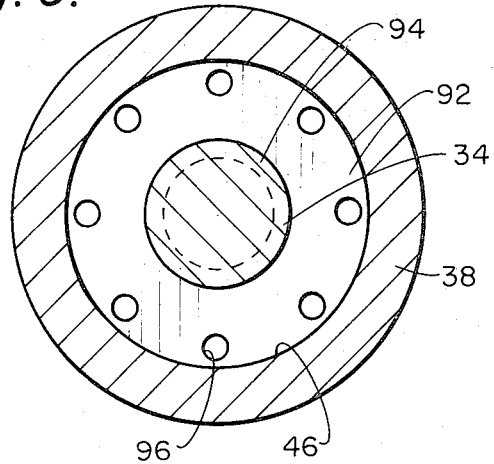
FIG. 6 is a cross-sectional view taken along line 6—6 of FIG. 2.

As the piston rod 34 begins to move within the chamber 46, the movable member 54 moves from the position against the nut 52 to against the fixed member 56. In this position, shown in FIG. 3 of the drawings, the gap 60 is closed and therefore the damping medium is not permitted to be conducted from one side of the piston head through the gap 60 to the other side of the piston head. This position, shown in FIG. 3, is maintained until the pressure value within the chamber 46 reaches a predetermined level. Upon the pressure value reaching a predetermined level, pressure of the damping medium causes the fixed member 56 to deflect axially as shown in FIG. 4 of the drawing, with the inner wall 74 being pushed against the fixed member 56. When this deflection occurs, the outer wall 72 is caused to be spaced from the fixed member 56, thereby opening the gap 60 and permitting the damping medium to be conducted from the damping medium chamber 46 through the opening 68 through the groove 70 and through the gap 60 to the opposite side of the piston head 50. It is to be noted that the position of the wall 72 with respect to the fixed member 56 provides a restricted flow of the damping medium so that a substantial amount of energy absorption occurs as the damping medium moves through the gap 60. As the pressure becomes more severe, the deflection of the fixed member 56 will be increased to slightly increase the space between the wall 72 and the fixed member 56. If the pressure is not too great, the fixed member 56 will only be deflected slightly. In other words, the apparatus of this invention functions as a relief valve to relieve the pressure within the chamber 46. This relieving of the pressure tends to deter failure to the damping mechanism. It is also to be noted that the deflection of the movable member 56 is self-regulative in that it automatically deflects an amount in order to achieve the maximum efficiency in energy absorption as the damping medium is being conducted through the gap 60.

Due to the internal pressure caused by the full insertion of the piston rod 34 and the initial preload, the piston rod 34 will be caused to move back to its initial position after the damping stroke. The internal pressure within the compressible solid material exerts a force upon the piston head 50 tending to move such in a direction opposite to the direction of the damping stroke. When this occurs, the piston rod 34 and the fixed member 56 tend to move away from the movable member 54 until the movable member comes into contact with the piston nut 52 and from that point on moves with the piston rod 34. However, with the movable member 54 in contact with the piston nut 52, space is provided for flow of the compressible solid material about the fixed member 56 through the annular gap 60 and through the aperture 68 into chamber 46. The flow of the compressible solid material continues until the piston rod 34 is entirely retracted. The amount of preload is established so that there will always be sufficient force to move the piston rod 34 back to its initial position, that is, the force of the preload to overcome the friction losses of the piston rod as it moves back to its initial position.

When the device of this invention operates as a draft gear, during the normal pulling movement of the railroad cars, there will be no appreciable movement of the piston rod 34 and in essence the damping apparatus of this invention operates as a rigid link. As a result, there will be no wear between the piston head 50 and the cylinder 38. Without any wear, the apparatus of this invention will last a significantly greater time interval than previously known damping apparatuses employed in draft gears and in fact it should take several years before replacement or repair of the apparatus of this invention would be required.

However, if an abnormal shock is transferred from one railroad car to the other railroad car through the draft gear employing the damping apparatus of this invention, the fixed member 56 is deflected to the position shown in FIG. 4 of the drawings. This deflection action permits a restrictive flow of the damping medium through the gap 60 which causes the energy of the shock force to be absorbed. At what energy level the fixed member 56 deflects is related to the thickness of the member 56 and the surface area of the side 66 exposed to the damping medium. Once the energy level drops below the predetermined selected amount of energy, the member 56 assumes its normal at rest configuration shown in FIG. 3 of the drawings. The piston rod 34 will then at this time be caused to move back to its initial state or its initial position by means of the internal compressive force within the damping medium and the preload force established within the damping medium. Movement of the piston rod 34 back to its initial position is accomplished in the same manner as was previously described.

Figure 7:
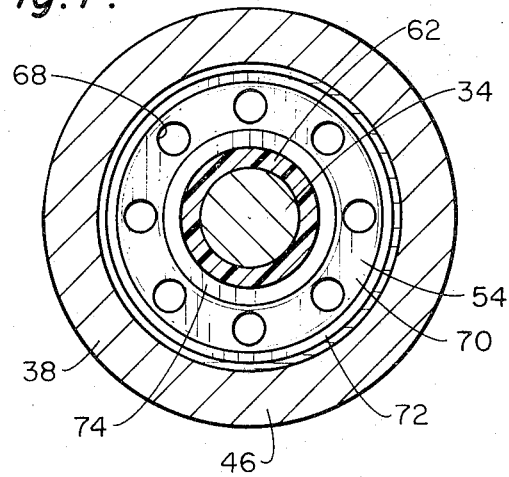
FIG. 7 is a cross-sectional view taken along line 7—7 of FIG. 2.
Figure 8:
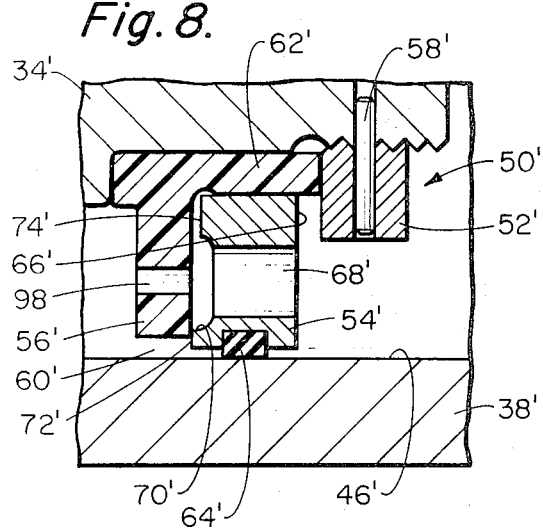
FIG. 8 is a view similar to FIG. 3 but showing a modified form of piston head.
Figure 9:
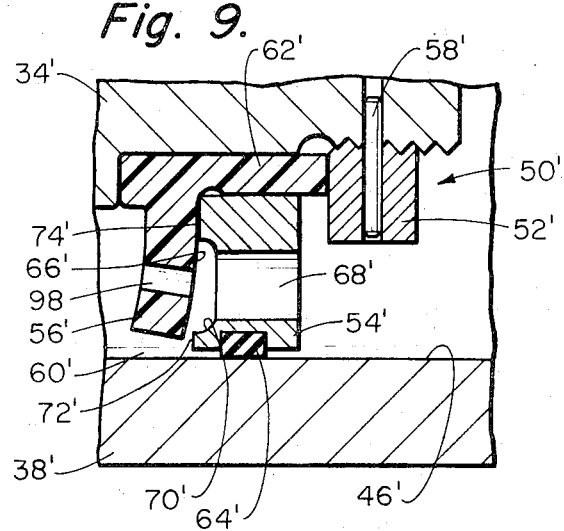
FIG. 9 is a view similar to FIG. 5 but also showing the modified form of piston head.
Figure 10:
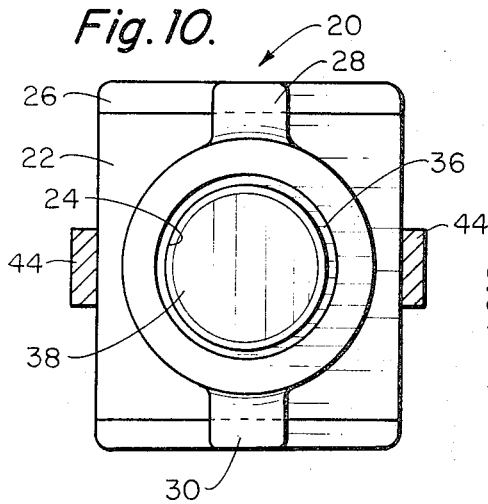
FIG. 10 is a cross-sectional view of the draft gear taken along line 10—10 of FIG. 1.
Figure 11:
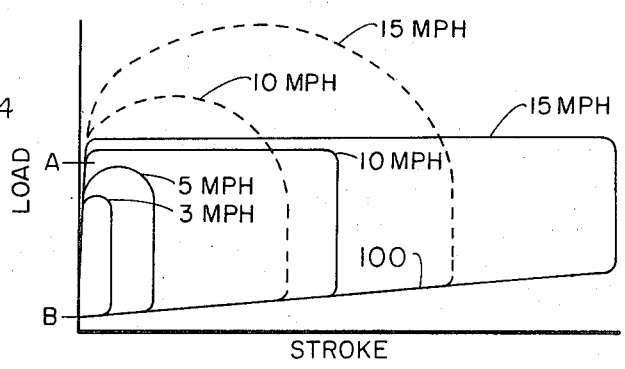
FIG. 11 is a graph denoting the energy absorption characteristics of the damping unit without the valve of this invention and also with the valve of this invention.

Referring in particular to FIGS. 7 and 8 of the drawings, a modification of the damping apparatus is shown. Like numerals have been employed to refer to like parts and it is believed to not be necessary to redescribe each of these parts. The primary distinction of the structure of FIGS. 7 and 8 is the inclusion of a plurality of orifices 98 within the fixed member 56'. The orifices 98 are to function to establish a particular level of pressure relief for the damping medium. In other words, in reference to a damping apparatus employed upon a bumper of a vehicle, it is desired that the fixed member 56' deflect only when a force is incurred when the vehicle exceeds an eight mile per hour or greater impact velocity. This is represented by point A within FIG. 10. Up to point A damping occurs only by passage of the damping medium through the orifices 98. At point A the fixed member 56' is caused to be tilted to also provide an additional access route of the damping medium through the gap 60'. As a result, the energy damping characteristics are best shown within FIG. 10 wherein once the fixed member 56' is deflected, the load level remains substantially constant but the stroke is extended. It is to be noted from FIG. 10 that the load level only increases slightly from a ten mile per hour velocity to a fifteen mile per hour velocity. Shown in FIG. 10 are dotted curves for also 10 miles per hour and 15 miles per hour which represent the energy absorption with only the orifices 98 being employed and no fixed member 56' being employed. As is shown in FIG. 10 the load of the dotted curves in each instance is substantially increased.

It is to be noted that the curves shown in solid lines within FIG. 10 can either apply to the embodiment of FIGS. 1 to 6 and 9 or the embodiment of FIGS. 7 and 8. Within the embodiment of FIGS. 7 and 8, the load level (represented by point A) at which the fixed member 56' begins deflection will be higher than the load level at which fixed member 56' will tilt. This is due to the inclusion of the orifices 98. In other words, a certain amount of load can be absorbed as a normal damping mechanism by the orifices 98 before the tilting of the fixed member 56' occurs. The deflection of the fixed member 56' is only to occur at a danger point. In other words, when the load reaches a level with respect to a vehicle wherein there is a great likelihood that excess damage or injury to persons within the vehicle will occur. At this point, the deflection of the member 56' will occur to tend to maintain the load level constant and not continue to substantially rise.

In reference to FIG. 10 of the drawings, point A is the load to correspond to vehicle velocity of 8 miles per hour (for FIGS. 7 and 8 only). The velocity of the railroad cars during impact at which the fixed member 56 will deflect will be substantially less than 8 miles per hour as, for example, 2 miles per hour. However, the basic solid curved relationship shown in FIG. 10 will apply to both the embodiments of this invention.

After the energy has been completely absorbed, the piston rod 34 is moved back to its initial position as represented by the stored energy of the spring line 100 in FIG. 10.

What is claimed is:

1. A damping apparatus comprising:
    a cylinder having an elongated interior chamber with one end being open and the other end being closed;
    a piston rod extending within said chamber, said piston rod being movable with respect to said chamber;
    a piston head connected to said piston rod, said piston head including a first member fixed to said piston rod and extending laterally therefrom, said first member located adjacent the wall of said chamber but spaced therefrom to form a gap therebetween;
    a damping medium located within said chamber in between said piston head and said closed end;
    a second member mounted upon said piston head, said second member capable of being in contact with both said first member and the wall of said chamber, said second member includes means for permitting said first member to deflect in respect to said second member, upon a predetermined level of damping force being achieved said first member deflects thereby permitting said damping medium to be conducted through said gap past said first member.

2. The damping apparatus as defined in claim 1 wherein:
    said first member being annular, said gap being annular.

3. The damping apparatus as defined in claim 2 wherein:
    said damping medium comprises a compressible solid material.

4. The damping apparatus as defined in claim 2 wherein:
    said first member includes an axial extension, said second member being mounted upon said axial extension, whereby said second member works directly against said first member during said tilting movement.

5. The damping apparatus as defined in claim 4 wherein:
    said second member being slidably mounted upon said axial extension between a damping position and a return position, with said second member in contact with said first member said gap being capable of being closed to thereby not permit passage of said damping medium therethrough, with said second member in said return position said damping medium being readily conductible through said gap.

6. The damping apparatus as defined in claim 5 wherein:
    said second member being ring-shaped in configuration, said second member including a plurality of spaced apart apertures therethrough, said apertures being adapted to conduct said damping medium into and out of said chamber.

7. The damping apparatus as defined in claim 6 wherein said means comprises:
    said second member having an annular groove in the side of said second member adjacent said first member, said annular groove to communicate with said apertures, a radially inner wall and a radially outer wall being formed on said second member located on each side of said annular groove, with said radially inner wall in normal contact with said first member said radially outer wall being displaced slightly from said first member, whereby upon the force within said damping medium reaching a predetermined level said first member is caused to be deflect so said radially outer wall comes into contact with said first member and said radially inner wall is displaced from said first member so as to permit the damping medium to be conducted through said gap.

8. The damping apparatus as defined in claim 7 wherein:
    said first member also includes opening means therethrough, whereby by varying the size of said opening means the value of force required to tilt said first member is varied.

9. A cushioning assembly designed in particular to damp draft and buff forces imparted to coupling means which couple adjacent cars of a railway vehicle, said cushioning assembly comprising:
    an elongated housing having a closed end wall and a passageway axially extending lengthwise from said closed end wall;
    a damped spring unit supported in said passageway and having an elongated casing of conforming configuration to said passageway, said elongated casing being slidably disposed within said passageway, said damped spring unit including a chamber formed in the said elongated casing;
    a piston and piston rod disposed axially in said chamber with said piston rod having an end portion extending from the inner end of said casing toward said closed end wall;
    spring damped means in said chamber for providing spring and damping forces between said elongated casing and said piston in both axial directions; and force transfer means for applying draft and buff forces separately against said damped spring unit.

10. The cushioning assembly as defined in claim 9 wherein:
    said piston has an axial orifice means and said damped spring means comprises a compressible solid filling said chamber for providing a damping and spring force between said elongated casing and said piston.

11. The cushioning assembly as defined in claim 9 wherein:
    said force transfer means comprises a front follower in engagement with the outer end face of said elongated casing of said damped spring unit.

12. The cushioning assembly as defined in claim 9 wherein:
said force transfer means comprises a strap yoke encompassing said cushioning assembly and in engagement with the rear wall of said housing.

13. The cushioning assembly as defined in claim 9 wherein:
said passageway in said housing has a cylindrical configuration and is provided with a pair of guide rings and the elongated casing has a cylindrical configuration of a slightly smaller diameter than the inside diameter of said guide rings.

14. The cushioning assembly as defined in claim 9 wherein:
said piston has an axial orifice means and said spring damped means comprises a compressible solid, said compressible solid being located within said chamber and is to provide damping and spring force between said elongated casing and said piston;
said force transfer means comprises a front follower in engagement with said outer end face of said elongated facing of said damped spring unit and a strap yoke encompassing said assembly which is in engagement with the rear wall of said housing;
said passageway in said housing has a cylindrical configuration and is provided with a pair of guide rings and the elongated casing has a cylindrical configuration of a slightly smaller diameter than the inside diameter of said guide rings.

* * * * *

Disclaimer 3,819,060.—*Giles A. Kendall*, Burbank, Calif., and *William D. Wallace*, Chicago, Ill. DAMPING APPARATUS. Patent dated June 25, 1974. Disclaimer filed May 2, 1975, by the assignee, *Menasco Manufacturing Co.*

Hereby enters this disclaimer to claims 1 and 2 of said patent.

[*Official Gazette June 24, 1975.*]